United States Patent [19]

Pavlas

[11] 4,023,431
[45] May 17, 1977

[54] SPRING LOADED SPLIT NUT

[75] Inventor: Garnet L. Pavlas, Houston, Tex.

[73] Assignee: Bettis Corporation, Houston, Tex.

[22] Filed: May 5, 1975

[21] Appl. No.: 574,619

[52] U.S. Cl. .......................................... 74/424.8 A
[51] Int. Cl.² .......................................... F16H 1/18
[58] Field of Search .......................... 74/424.8 A

[56] References Cited

UNITED STATES PATENTS

| 1,721,227 | 7/1929 | Manley | 74/424.8 A |
| 2,463,263 | 3/1949 | Gordon | 74/424.8 A |
| 2,894,408 | 7/1959 | Verhoeff | 74/424.8 A |
| 3,730,008 | 5/1973 | Sheesley | 74/424.8 A |

Primary Examiner—Samuel Scott
Assistant Examiner—Wesley S. Ratliff, Jr.
Attorney, Agent, or Firm—Robert W. B. Dickerson

[57] ABSTRACT

Spring loaded member for automatically biasing a split nut toward engagement with a threaded rod, and rotatable cam member for effecting disengagement.

4 Claims, 6 Drawing Figures

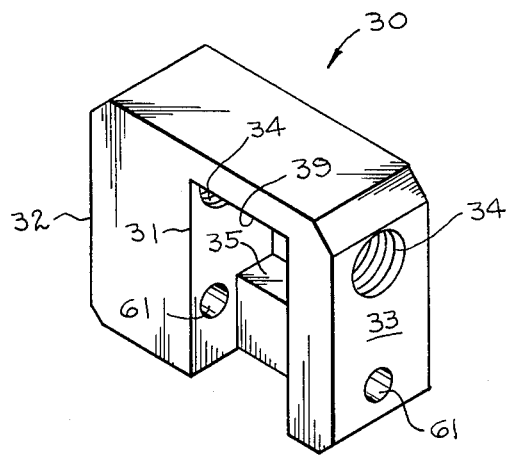
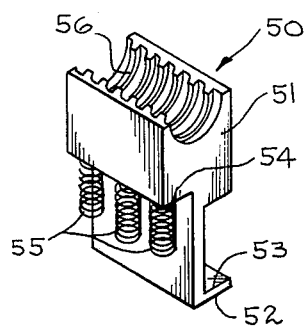
fig.2  fig.3
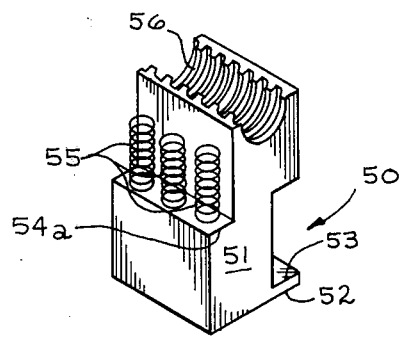
fig.3a
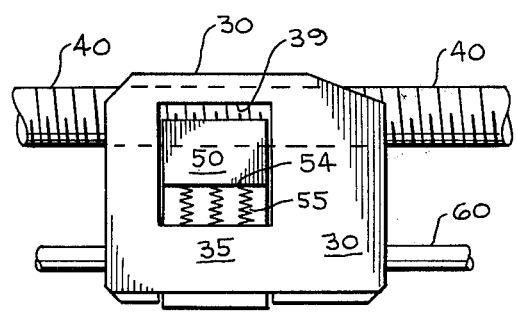 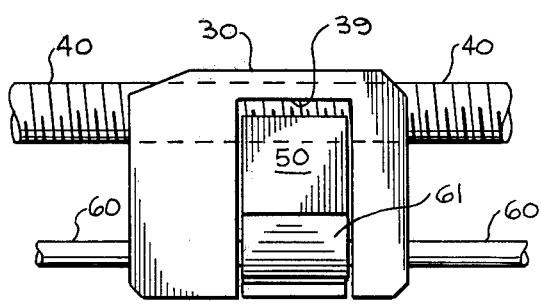
fig.4  fig.5

SPRING LOADED SPLIT NUT

BACKGROUND OF THE INVENTION

Actuators have long been used to control the operation of other devices, such as flow-controlling valves. Such actuators have normally been hydraulically, pneumatically, or electrically motivated. Oftentimes back-up systems were desirable, to permit actuation in the event of power failures, or the like. Means have previously been developed to permit selective engagement and disengagement of such back-up systems. An example of such development is illustrated in U.S. Pat. No. 3,677,108. Although the latter mentioned development represented a substantial advance over the prior art, it has proved desirable in some applications to ensure positive engagement of said back-up system. Positive disengagement may also be desired. It is to the solution of such problems that this invention is directed.

SUMMARY OF THE INVENTION

A retainer member, which may be linked to a piston rod is slidable along a screw. A split nut, or follower, is carried along with said retainer by virtue of the follower being positioned within a cutaway portion of the retainer. The split nut is releasably threadedly engageable with the screw. A spring device urges engagement, and a rotatable cam may cause disengagement. If desired, the reverse may be true, i.e., the spring device may urge disengagement. When the nut and screw are engaged, rotation of the screw results in longitudinal movement of the follower.

DESCRIPTION OF THE DRAWINGS

FIG. 2 is a perspective of the retainer member;

FIG. 3 is a perspective of a first embodiment of the split nut, or follower;

FIG. 3a is a perspective of a second embodiment of the follower;

FIG. 4 is a rear elevation of the assembled retainer and follower; and

FIG. 5 is a front elevation thereof.

DESCRIPTION OF THE INVENTION

Figure 1:
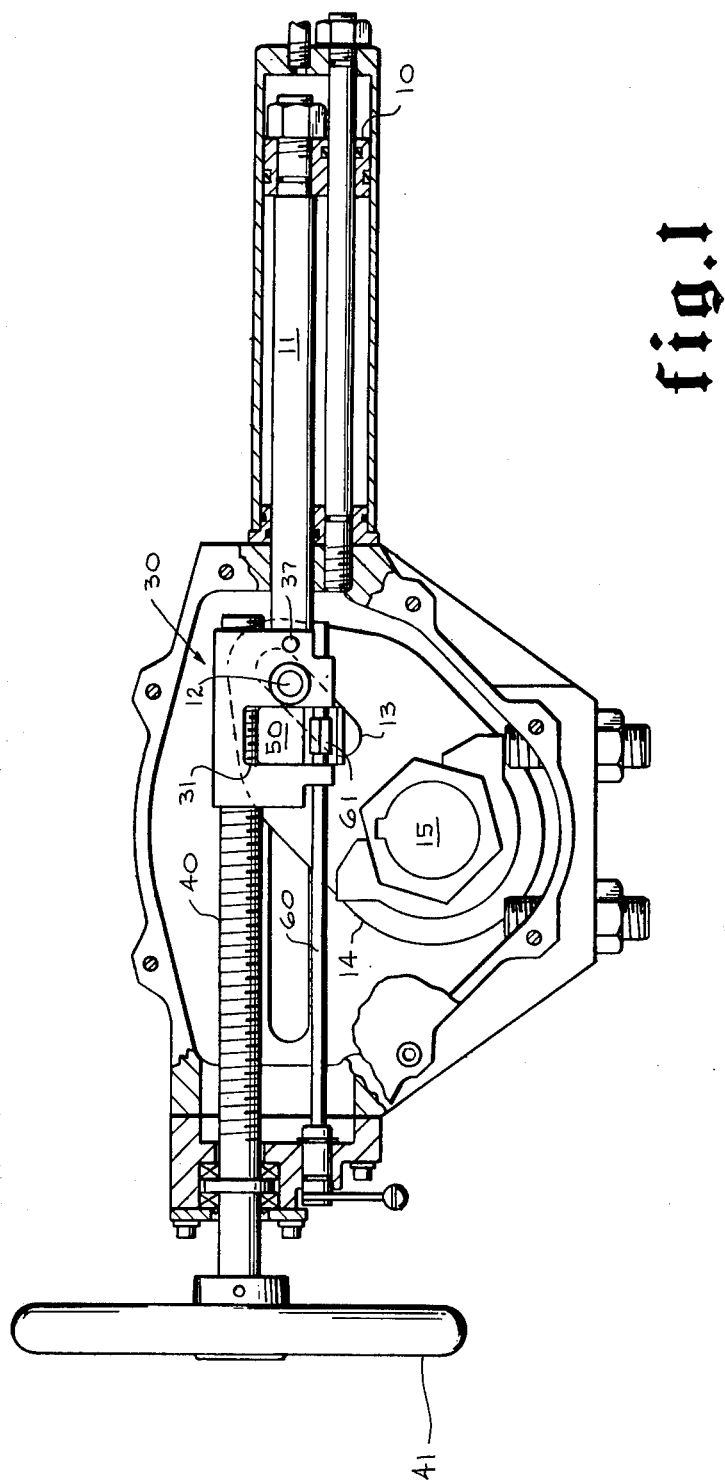
FIG. 1 is an elevation of an actuator having previously known engagement and disengagement mechanism, the actuator housing cover being removed.

FIG. 1 exemplifies the overall operation of an actuator, having a disengageable manual control. The general actuator structure is not claimed to be new and is, in fact, described by the aforementioned U.S. Pat. No. 3,677,108. For ease of presentation, such operation will be described. Normally, an outside source of fluid pressure will cause reciprocation of piston 10. Such piston's rod 11 is fixed at one end to retainer 30. The retainer carries a pin 12, whose free ends ride in slots 13 of the arms of an oscillatable yoke 14. The hub of the yoke is keyed to valve stem 15. Thus as the yoke oscillates, it turns the valve stem, thereby causing the associated valve to open or close. For operation during particular situations, such as power failure to or from the source of pressurized fluid, manually operative means are provided. A screw 40, having a handle 41 at one end, is slidably received by said retainer 30. Within a cutaway portion 31 of said retainer, a split nut of follower 50 is movably positioned. A splined rod 60 carries a cam 61 thereon, and is slidably received by said retainer. As the splined rod 60 is rotated, the cam 61 may engage follower 50, causing it to threadedly engage screw 40. Then as the screw is rotated by its handle, the threaded engagement between screw 40 and follower 50, will cause the retainer 30 to move therewith. Such linear movement will, by virtue of pin 12 and slots 13, cause rotation of yoke 14.

The improvement of this invention is illustrated by FIGS. 2-5. The overall assembly in an actuator would be like that of FIG. 1. Actuator 30 is made generally U-shaped by cutaway portion 31, forming legs 32, 33 and web 39. Unthreaded passageway 34 extends through both legs of the retainer, to slidably receive screw 40. Across the rear of the retainer, a rib 35 connects legs 32, 33. Means are provided (not shown in FIGS. 2-5) for anchoring a piston rod to the retainer (similar to pin 37 of FIG. 1).

Embodiments of the split nut or follower are shown in FIGS. 3 and 3a. In either case, a hemi-cylindrical body 51, having threads 56 joins a L-shaped extension 52, to form a channel 53. In the embodiment of FIG. 3, said body includes a downwardly facing shoulder 54, while that of FIG. 3a includes an upwardly facing should 54a. Either of said shoulders serves as a seat for spring member of members 55.

The assembly of the device, including either embodiment of split nut 50, is as follows. Retainer 30 would be affixed to a piston rod such as 11 by a pin 37. Screw 40 would have retainer 30 mounted thereon by passing through unthreaded apertures 34. Split nut 50 would be positioned within retainer cutaway portion 31, with channel portion 53 facing forwardly. Shaft 60 would pass through retainer apertures 61, so as to position cam 61 within follower channel 53. Upward movement of follower 50 will engage threads 56 with screw 40. On this occurring, rotation of screw 40 will cause linear movement of follower 50, and thereby linear movement of retainer 30. Retainer movement, by virtue of pin 12 and slot 13, causes yoke and valve stem rotation or oscillation. Vertical movement of follower 50 is caused by rotation of splined rod 60, causing cam 61 to exert a force against one of the walls of follower channel 53. As previously mentioned, member 50 may be biased toward engagement or disengagement with screw 40. Generally, springs 55 would be seated against downwardly facing follower shoulder 54 and the upwardly facing surface of retainer rib 35. Thus, the follower would be biased toward threaded engagement, requiring rotation of rod 60 to cause disengagement. If the opposite bias is desired, an upwardly facing shoulder 54a (Fig. 3a) of follower 30, and the interior surface of retainer web 39 serve as seats for spring 55. This results in a disengagement bias.

Although only limited embodiments have been described, it should be obvious that numerous modifications would be possible by one skilled in the art without departing from the spirit of the invention, the scope of which is limited only by the following claims.

I claim:

1. In an actuator having power driven linearly movable piston means for rotating a valve stem, and back-up means for rotating such valve stem, wherein such back-up means includes a rotatable threaded screw, means for coupling said piston means to said valve stem, and means for releasably engaging said screw with said coupling means, the improvement comprising:

means for biasing said engaging means toward a position resulting in screw engagement, said coupling means includes a retainer fixed to said piston means for movement therewith and having an unthreaded passageway therethrough for slidably receiving said screw, said engaging means includes a split nut having a threaded portion engageable with said screw, and said biasing means includes at least one spring.

2. The device of claim 1 wherein each of said retainer and said split nut includes a spring seat, said spring being positioned between said seats.

3. In an actuator having power driven linearly movable piston means for rotating a valve stem, and back-up means for rotating such valve stem, wherein such back-up means includes a rotatable threaded screw, means for coupling such piston means to said valve stem and means for releasably engaging said screw with said coupling means, the improvement comprising:

means for biasing said engaging means toward a position resulting in screw disengagement, said coupling means includes a retainer fixed to said piston means for movement therewith and having an unthreaded passageway therethrough for slidably receiving said screw, said engaging means includes a split nut having a threaded portion engageable with said screw, and said biasing means includes at least one spring.

4. The device of claim 3 wherein each of said retainer and said split nut includes a spring seat, said spring being positioned between said seats.

* * * * *